United States Patent
Wu et al.

(10) Patent No.: US 10,804,748 B2
(45) Date of Patent: Oct. 13, 2020

(54) WIRELESS POWER SYSTEM WITH FOREIGN OBJECT DETECTION

(71) Applicant: Apple Inc., Cupertino, CA (US)

(72) Inventors: Hunter H. Wu, San Jose, CA (US); Anlang Lu, Cupertino, CA (US); Brandon Pierquet, San Francisco, CA (US); Jouya Jadidian, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 370 days.

(21) Appl. No.: 15/817,036

(22) Filed: Nov. 17, 2017

(65) Prior Publication Data

US 2018/0166928 A1 Jun. 14, 2018

Related U.S. Application Data

(60) Provisional application No. 62/434,251, filed on Dec. 14, 2016.

(51) Int. Cl.
| | |
|---|---|
| *H02J 50/60* | (2016.01) |
| *H02J 50/10* | (2016.01) |
| *H01F 38/14* | (2006.01) |
| *H01F 27/28* | (2006.01) |
| *H02J 7/02* | (2016.01) |

(52) U.S. Cl.
CPC .......... *H02J 50/60* (2016.02); *H01F 27/2885* (2013.01); *H01F 38/14* (2013.01); *H02J 50/10* (2016.02); *H02J 7/025* (2013.01)

(58) Field of Classification Search
CPC . H02J 50/60; H02J 50/10; H02J 7/025; H01F 38/14; H01F 27/2885

USPC .......................................... 307/104; 320/108
See application file for complete search history.

(56) References Cited

U.S. PATENT DOCUMENTS

| | | | |
|---|---|---|---|
| 9,209,627 B2 | 12/2015 | Baarman et al. | |
| 2003/0199264 A1* | 10/2003 | Holenstein | H04L 25/061 |
| | | | 455/324 |
| 2004/0248537 A1* | 12/2004 | Zellweger | H03D 3/007 |
| | | | 455/260 |

(Continued)

FOREIGN PATENT DOCUMENTS

WO 2016076733 A1 5/2016

*Primary Examiner* — Rexford N Barnie
*Assistant Examiner* — Thai H Tran
(74) *Attorney, Agent, or Firm* — Treyz Law Group, P.C.; G. Victor Treyz; Michael H. Lyons

(57) ABSTRACT

Wireless power transmitting equipment may transmit wireless power signals to wireless power receiving equipment. The wireless power transmitting equipment may have a wireless power transmitter coupled to a wireless power transmitting coil. The wireless power receiving equipment may have a wireless power receiving coil coupled to wireless power receiving circuitry such as a rectifier. Foreign object detection coil arrays may be formed from arrays of metal traces on printed circuit substrates that overlap the wireless power transfer coils. Control circuitry in the transmitting equipment and the receiving equipment may monitor signals from foreign object detection circuitry that is coupled to the coil arrays. The foreign object detection circuitry may produce in-phase and quadrature signals that are indicative of whether a foreign object is overlapping a foreign object detection coil array.

20 Claims, 10 Drawing Sheets

(56) References Cited

U.S. PATENT DOCUMENTS

| | | | |
|---|---|---|---|
| 2011/0069797 A1* | 3/2011 | Lo .......................... | H04B 1/30 |
| | | | 375/350 |
| 2012/0286581 A1* | 11/2012 | Ryu ....................... | H02J 5/005 |
| | | | 307/104 |
| 2014/0015329 A1 | 1/2014 | Widmer et al. | |
| 2014/0091634 A1 | 4/2014 | Mayo et al. | |
| 2014/0111019 A1 | 4/2014 | Roy et al. | |
| 2014/0111154 A1* | 4/2014 | Roy ....................... | G01V 3/081 |
| | | | 320/108 |
| 2015/0260835 A1* | 9/2015 | Widmer .................. | G01S 13/04 |
| | | | 342/27 |
| 2015/0331135 A1 | 11/2015 | Widmer | |
| 2016/0031332 A1 | 2/2016 | Garcia Briz et al. | |
| 2016/0187519 A1 | 6/2016 | Widmer et al. | |
| 2016/0238731 A1 | 8/2016 | Chopra et al. | |

* cited by examiner $$I\_signal = \overbrace{\{A_m \sin(w_c t + \Phi_m) + A_F \sin(w_c t + \Phi_F) + HF\_noise\}}^{94} \cdot \sin(w_c t) \quad (1)$$

$$I\_signal = \overbrace{0.5A_m \cos(\Phi_m)}^{96} \overbrace{-0.5A_m \cos(2w_c t + \Phi_{mc})}^{98} \overbrace{+0.5A_F \cos(\Phi_F)}^{96} \overbrace{-0.5A_F \cos(2w_c t + \Phi_F) + HF\_noise}^{96} \quad (2)$$

$$I'\_signal = \underbrace{0.5A_F \cos(\Phi_F)}_{100} \underbrace{+0.5A_m \cos(\Phi_m)}_{102} \underbrace{-DC\_OFFSET + HF\_components}_{104} \quad (3)$$

$$Q\_signal = \{A_m \sin(w_c t + \Phi_m) + A_F \sin(w_c t + \Phi_F) + HF\_noise\} \cdot \cos(w_c t) \quad (4)$$

$$Q\_signal = 0.5A_m \sin(\Phi_m) + 0.5A_m \sin(2w_c t + \Phi_m) + 0.5A_F \sin(\Phi_F) - 0.5A_F \sin(2w_c t + \Phi_F) + HF\_noise \quad (5)$$

$$Q'\_signal = 0.5A_F \sin(\Phi_F) + 0.5A_m \sin(\Phi_m) - DC\_OFFSET + HF\_components \quad (6)$$

*FIG. 7*

WIRELESS POWER SYSTEM WITH FOREIGN OBJECT DETECTION

This application claims the benefit of provisional patent application No. 62/434,251, filed on Dec. 14, 2016, which is hereby incorporated by reference herein in its entirety.

FIELD

This relates generally to wireless systems, and, more particularly, to systems in which power is transferred wirelessly.

BACKGROUND

In a wireless power transfer system, a wireless power transmitting device such as charging mat may wirelessly transmit power to wireless power receiving equipment. The wireless power receiving equipment may use this power to charge a battery. In some situations, unwanted foreign objects may be present in the vicinity of wireless power transfer equipment. Foreign object detection circuitry may be used to detect these objects.

SUMMARY

Wireless power transmitting equipment may transmit wireless power signals to wireless power receiving equipment. The wireless power transmitting equipment may have a wireless power transmitter coupled to a wireless power transmitting coil. A power source such as a mains power source may provide the wireless power transmitter with power.

The wireless power receiving equipment may have a wireless power receiving coil coupled to wireless power receiving circuitry such as a rectifier. The rectifier may supply wirelessly received power to a battery in the wireless power receiving equipment to charge the battery.

Foreign object detection coil arrays may be formed from arrays of metal traces on printed circuit substrates that overlap the wireless power transfer coils. The foreign object detection coil arrays may overlap the wireless power transmitting coil and the wireless power receiving coil. Foreign object detection circuitry may be coupled to the coil arrays. The foreign object detection circuitry may include an oscillator that serves as a transmitter to transmit signals from a coil in a foreign object detection coil array and may include mixing circuitry such as multipliers, phase-shifting circuitry, filtering circuitry, and other circuitry for producing in-phase and quadrature signals from corresponding signals received with a coil in the foreign object detection coil array. The in-phase and quadrature signals may be indicative of whether a foreign object is overlapping a foreign object detection coil array.

Control circuitry in the transmitting equipment and the receiving equipment may monitor signals from the foreign object detection circuitry. If a foreign object is detected, appropriate actions may be taken such as issuing alerts and stopping power transfer operations until the foreign object is cleared.

BRIEF DESCRIPTION OF THE DRAWINGS

FIG. 7 shows equations associated with processing foreign object detection system signals with the circuitry of FIG. 6 in accordance with an embodiment.

DETAILED DESCRIPTION

A wireless power transfer system may have wireless power transfer equipment such as wireless power transmitting equipment that transmits power and corresponding wireless power receiving equipment that receives wirelessly transmitted power.

The wireless power transmitting equipment may be equipment such as a wireless charging mat, wireless charging station, wireless charging puck, wireless charging stand, wireless charging table, or other wireless power transmitting equipment. The wireless power transmitting equipment may have one or more coils that are used in transmitting wireless power to wireless power receiving equipment. The wireless power receiving equipment may be an electronic device such as a portable electronic device, a vehicle, or other electronic equipment that receives wirelessly transmitted power.

During operation, the wireless power transmitting equipment may supply alternating-current signals to one or more wireless power transmitting coils. This causes the coils to transmit alternating-current electromagnetic signals (sometimes referred to as wireless power signals) to the wireless power receiving equipment. The wireless power receiving equipment may have one or more coils for receiving the transmitted wireless power signals.

Foreign object detection equipment may be used to monitor for the intrusion of coins, paper clips, soda cans, and other undesired conductive objects in the vicinity of the wireless power system. If these foreign objects are detected, power transfer operations can be suspended and a may be issued an alert such as an alert instructing the user to clear the objects away from the wireless power system.

Figure 1:
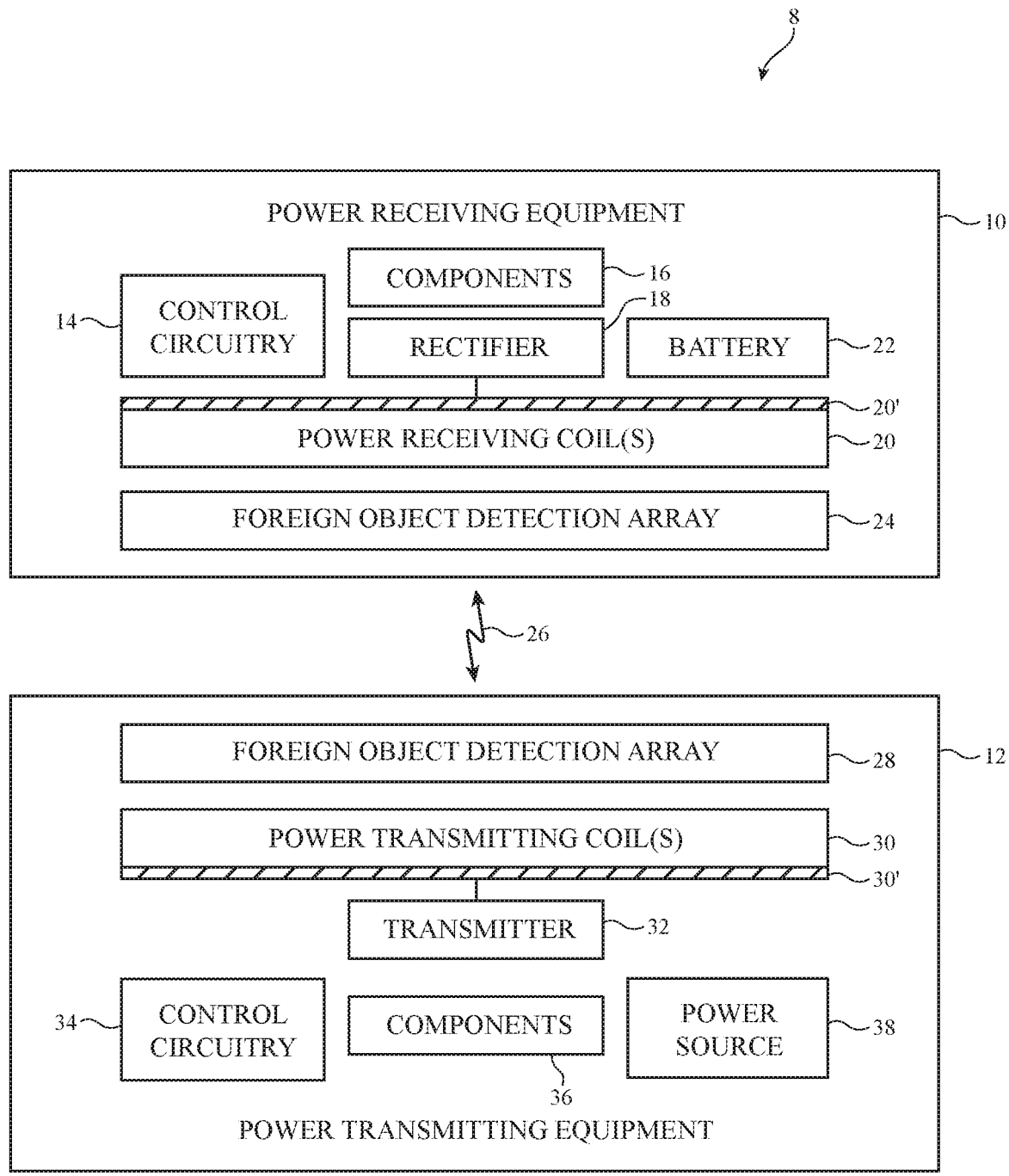
FIG. 1 is a schematic diagram of an illustrative wireless charging system in accordance with some embodiments.

An illustrative wireless power system (wireless charging system) is shown in FIG. 1. As shown in FIG. 1, wireless power system 8 may include wireless power transfer equipment such as wireless power transmitting equipment 12 and wireless power receiving equipment 10.

Power transmitting equipment 12 may be a mat, equipment built into a parking space, circuitry built into furniture or part of a vehicle, a charging stand, an electronic device such as a portable electronic device or desktop equipment, or may be other power transmitting equipment. For example, power transmitting equipment 12 may be a wireless charging mat or other wireless charger that rests under a vehicle during wireless charging, may be a wireless charging mat that rests on a table or other surface and that receives a portable electronic device on its surface, may be a wireless charger embedded into furniture, or other wires power transmitting equipment. Equipment 10 may be a vehicle, an electronic device, or other wireless power receiving equipment.

As shown in FIG. 1, wireless power transmitting equipment 12 may have one or more power transmitting coils such as wireless power transmitting (wireless power transfer) coil(s) 30. Wireless power transmitter 32 may provide alternating current signals to coil(s) 30 that cause coil(s) 30 to emit electromagnetic fields 26 that are near-field coupled to corresponding wireless power receiving coil(s) 20 in wireless power receiving equipment 10. Rectifier 18 may rectify received signals from coil(s) 20 and may produce corresponding direct-current (DC) power for equipment 10. Coil(s) 30 and coil(s) 20 may have ferromagnetic and conductive shield layers or other shields (e.g., ferrite tiles, a layer of metal such as an aluminum layer, etc.), as illustrated by shielding layers 30' and 20' to shield internal circuitry from electromagnetic fields 26 during operation.

Power transmitting equipment 12 may have a power source such as power source 38. Power source 38 may be a source of alternating current voltage such as a wall outlet that supplies line power or other source of mains electricity or a source of direct-current voltage such as a battery. Power transmitting equipment 12 may have a power converter such as an AC-DC power converter for converting power from a mains power source or other power source into DC power. Power source 38 may be used to power control circuitry 34 and components 36 in equipment 12 and may be used to provide transmitter 32 with power to transmit to equipment 10. In equipment 10, power from rectifier 18 may be used to charge battery 22 and to power control circuitry 14 and components 16. Components 36 and 16 may include light-emitting components, displays, buttons, sensors, wireless communications circuitry, audio equipment and/or other input-output devices and components for supporting the operation of equipment 12 and/or 10. In some configurations, equipment 10 and/or 12 may include motors, transmissions, steering systems, seating, body panels, doors and windows, and other vehicle components.

Equipment 12 may include an array of foreign object detection coils such as array 28. Equipment 10 may include an array of foreign object detection coils such as array 24. Array 28 may overlap coil(s) 30 and may be used to monitor for the presence of foreign objects that overlap coil(s) 30. Array 24 may overlap wireless power receiving (wireless power transfer) coil(s) 20 and may be used to monitor for the presence of foreign objects that overlap coils 20(s). During operation, control circuitry 34 can use array 28 to detect whether foreign objects are in the vicinity of array 28 and control circuitry 14 can use array 24 to detect whether foreign objects are in the vicinity of array 24. Configurations in which circuitry 34 and/or circuitry 14 uses array 28 and/or array 24 or other foreign object detection components to monitor for the presence of foreign objects at other locations between arrays 24 and 28 (e.g., at locations within an air gap separating arrays 24 and 28 that are not immediately adjacent to arrays 24 and 28) may also be used, if desired.

Control circuitry 34 and 14 may include storage and may include processing circuitry such as microprocessors, power management units, baseband processors, digital signal processors, microcontrollers, and/or application-specific integrated circuits with processing circuits. Control circuitry 34 and 14 may be configured to execute instructions for implementing desired control and communications features in system 8. For example, control circuitry 34 and/or 14 may be used in determining power transmission levels, processing sensor data, processing user input, processing other information such as information on wireless coupling efficiency from transmitting circuitry 32, processing information from wireless power receiving circuitry in equipment 10 such as rectifier 18, using information from arrays 28 and 24 and sensors in components 16 and/or 36 to determine when to start and stop wireless charging operations, adjusting charging parameters such as charging frequencies, coil assignments in a multi-coil array, and wireless power transmission levels, and performing other control functions. Control circuitry 34 and/or 14 may be configured to perform these operations using hardware (e.g., dedicated hardware or circuitry) and/or software (e.g., code that runs on the hardware of system 8). Software code for performing these operations may be stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media. Software stored on the non-transitory computer readable storage media may be executed on the processing circuitry of control circuitry 34 and/or 14. The processing circuitry may include application-specific integrated circuits with processing circuitry, one or more microprocessors, or other processing circuitry.

Figure 2:
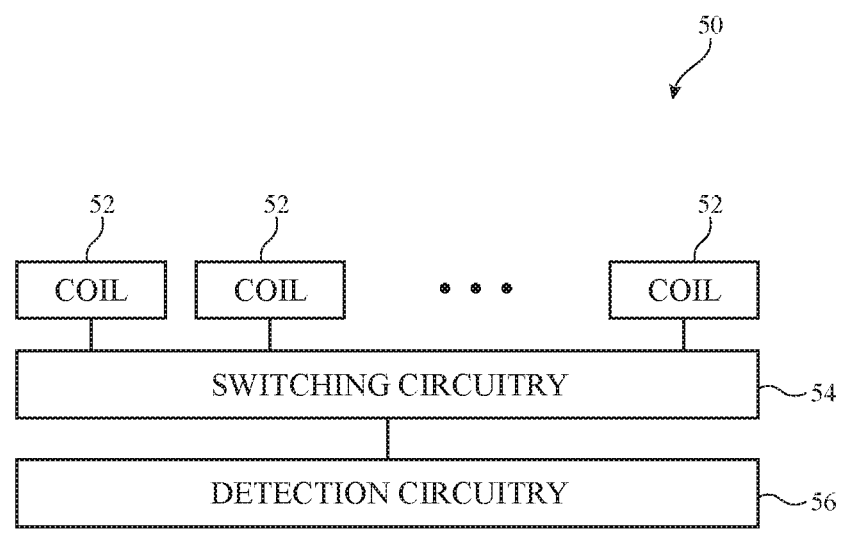
FIG. 2 is a schematic diagram of an illustrative foreign object detection system in accordance with an embodiment.

An array of coils may be used to perform foreign object detection. An illustrative coil array (e.g., coil array 28 or coil array 24 of FIG. 1) is shown in FIG. 2. As shown in FIG. 2, coil array 50 may include coils (loops of wire that form inductors) such as coils 52. Coil array 50 may include 2-100 coils, 5-20 coils, 10-500 coils, 40-150 coils, fewer than 500 coils, fewer than 300 coils, fewer than 100 coils, at least 10 coils, at least 20 coils, at least 40 coils, at least 80 coils, at least 160 coils, at least 400 coils, or other suitable number of coils 52. Coils 52 may be arranged in a two-dimensional planar array (e.g., to form an upper layer of a charging mat, etc.).

Switching circuitry 54 may include an array of transistors and/or other switching circuitry that can be configured by control signals produced by control circuitry 34 and/or 14. The control signals may, for example, switch a desired one of coils 52 into use as a transmitting coil and may switch a desired one of coils 52 into use as a receiving coil by selectively coupling the transmitting and receiving coils to detection circuitry 56.

Detection circuitry 56 may include circuitry such as signal generator circuitry (transmitter circuitry) and signal detection circuitry (receiver circuitry). Control circuitry 34 and/or 14 may use detection circuitry 56 to supply alternating current signals to one or more coils 52 in array 50 that have been selected by switching circuitry 54. These selected transmitting coil(s) 52 in array 50 may then produce corresponding electromagnetic signals (e.g., time-varying magnetic fields). The electromagnetic signals may be detected by one or more selected receiving coils 52 in array 50. Control circuitry 34 and/or 14 may configure switching circuitry 54 so that current signals from the selected electromagnetic signal receiving coils are routed to the signal detection circuitry. In presence of foreign objects, the electromagnetic signals that are conveyed between the signal transmitting coil(s) and the signal receiving coil(s) will be altered. Detection circuitry 56 can detect the presence of foreign objects by processing the received signals (e.g., by comparing the transmitted and received signals and processing associated phase and magnitude information from this comparison).

Figure 3:
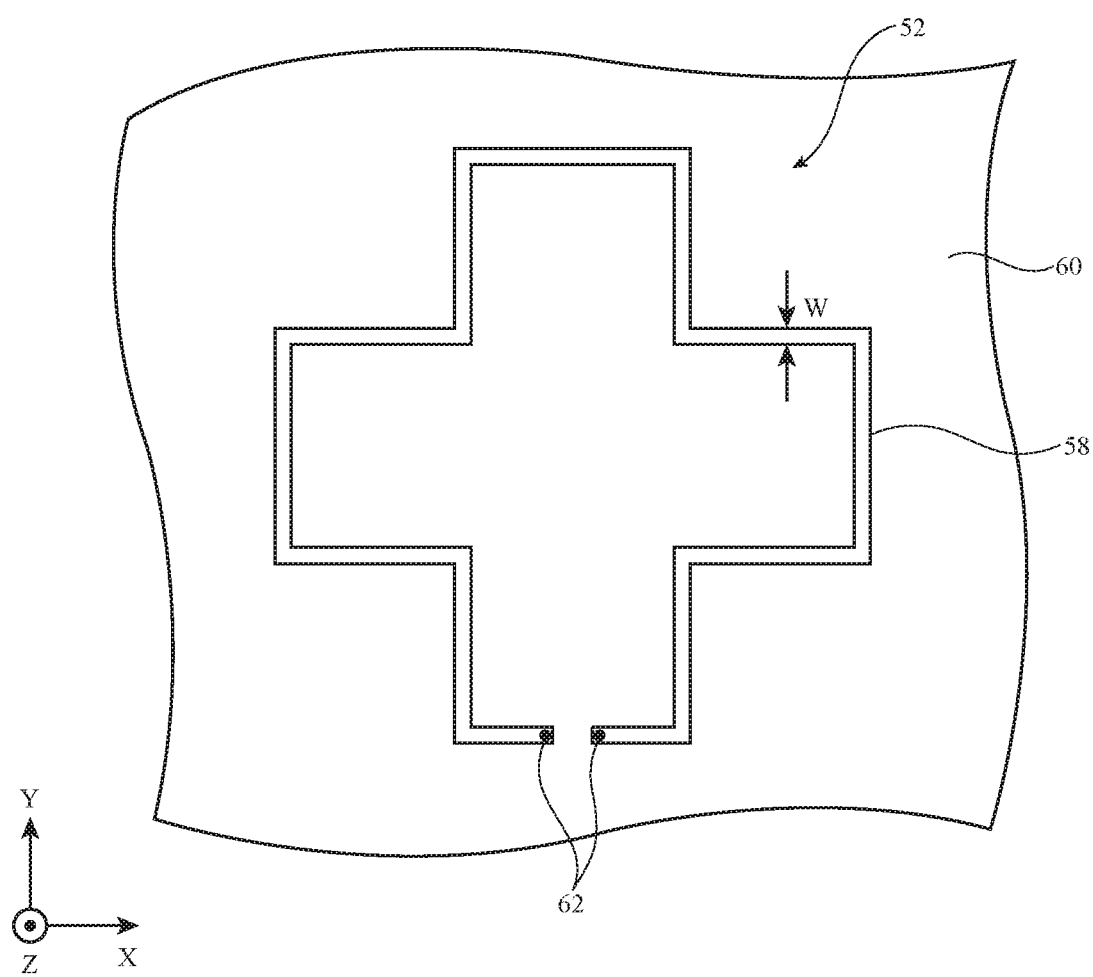
FIG. 3 is a diagram of an illustrative foreign object detection coil for a foreign object detection coil array in accordance with an embodiment.

Coils 52 may have any suitable shapes. An illustrative cross-shaped coil is shown in FIG. 3. As shown in FIG. 3, coil 52 may be formed from a metal trace such as metal trace 58 (e.g., a copper line or a conductive signal path formed from one or more other metals). Traces such as trace 58 may be arranged to form an array of coils 52 on substrate 60. Substrate 60 may be a printed circuit such as a flexible printed circuit formed from a sheet of polyimide or other flexible polymer layer or a rigid printed circuit board formed from a rigid printed circuit board substrate material such as fiberglass-filled epoxy (e.g., FR4). Terminals 62 of each trace 58 may be coupled to detection circuitry 56 through switching circuitry 54.

Trace 58 may have a width W. The value of width W may be, for example, 0.9 mm, 0.1 to 3 mm, at least 0.5 mm, at least 0.8 mm, less than 1.4 mm, less than 2 mm, 0.3-1.5 mm, or other suitable width. The thickness of trace 58 may be 200 microns, at least 50 microns, at least 100 microns, less than 200 microns, less than 250 microns, less than 300 microns, less than 400 microns, or other suitable thickness (e.g., less than 250 microns, which is the skin depth of copper at 50-400 kHz, to help minimize eddy currents in trace 58, etc.). The lateral dimensions (dimensions along axes X and Y in the X-Y plane of substrate 60) of coil 52 may be at least 5 mm, at least 1 cm, at least 2 cm, at least 4 cm, at least 6 cm, less than 10 cm, less than 8 cm, less than 5 cm, 1-6 cm, 2-5 cm, or other suitable size. Relatively small coils 52 may be provided to help enhance foreign object detection accuracy while minimizing the amount of magnetic field that is received by each coil 52 during operation of power transmitting coil(s) 30 and power receiving coil(s) 20 to transfer wireless power. The use of a layout such as the cross-shaped outline of FIG. 3 for coils 52 may also help minimize magnetic field reception from coil(s) 30 without compromising sensitivity when detecting small coins and other small foreign objects.

Figure 4:
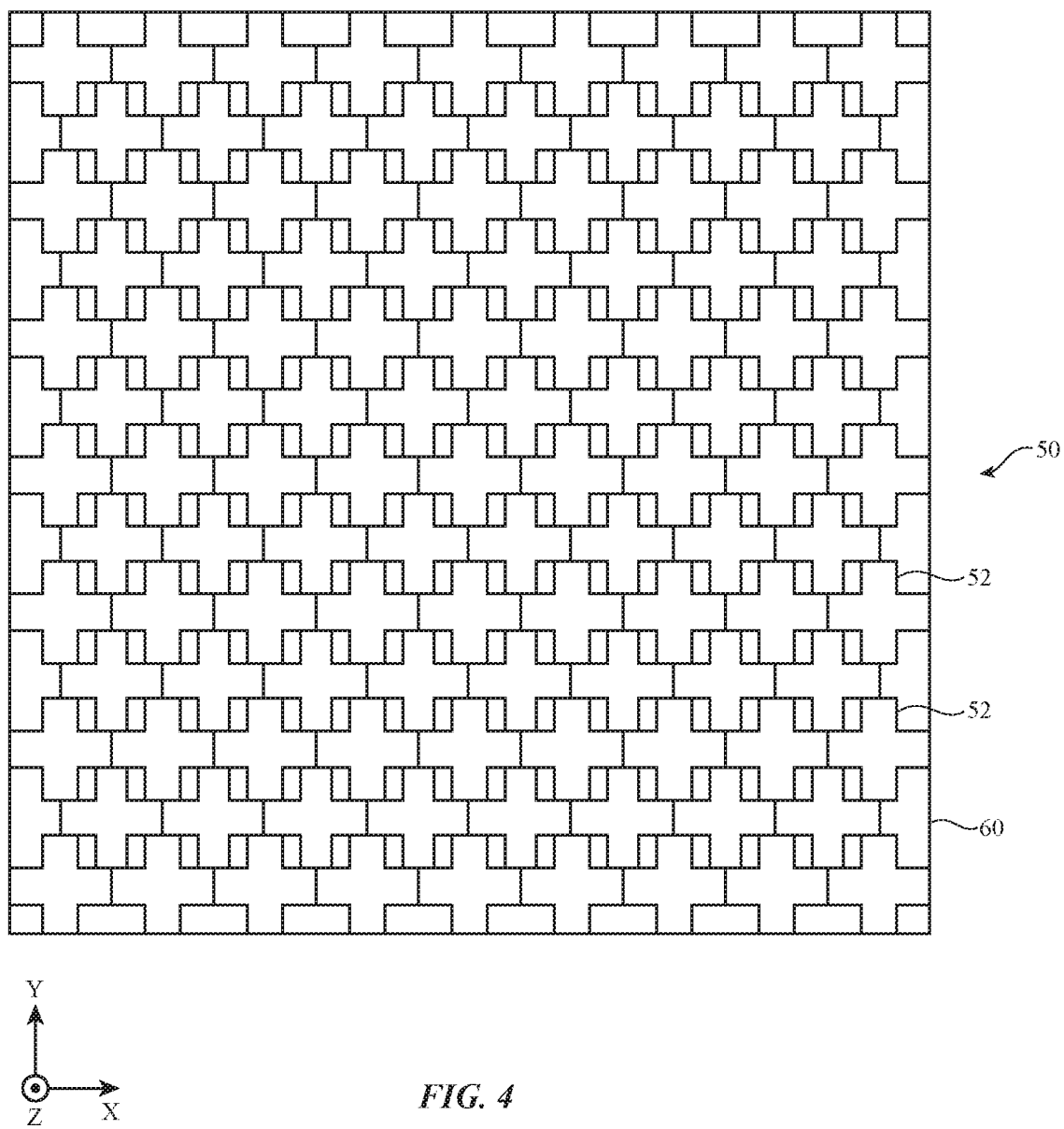
FIG. 4 is a top view of an illustrative foreign object detection coil array in accordance with an embodiment.
Figure 5:
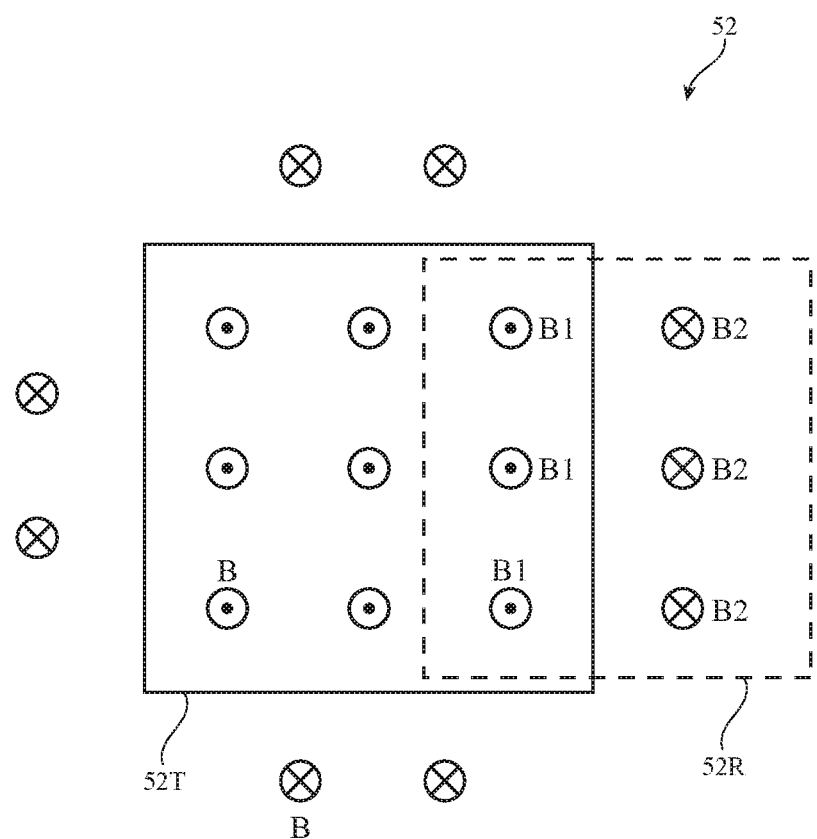
FIG. 5 is a diagram showing how adjacent foreign object detection coils may be oriented relative to each other in accordance with an embodiment.

FIG. 4 is a top view of an illustrative array 50 of coils 52. As shown in FIG. 4, cross-shaped coils 52 may be arranged in a two-dimensional array in the X-Y plane on substrate 60. Adjacent coils 52 may overlap to minimize coverage gaps. FIG. 5 shows how coils 52 (e.g., square coils in the FIG. 5 example) can be overlapped so that the amount of magnetic field flux B that is generated by transmitting coil 52T is equally divided between upwardly oriented flux (B1) and downwardly oriented flux (B2) within receiving coil 52R. As a result, the net magnetic flux through coil 52R and therefore the received signals at coil 52R are minimized the absence of foreign objects such as foreign object 62 that overlaps coil 52T and/or 52R. This type of balanced flux arrangement may help minimize noise and enhance detection sensitivity.

Figure 6:
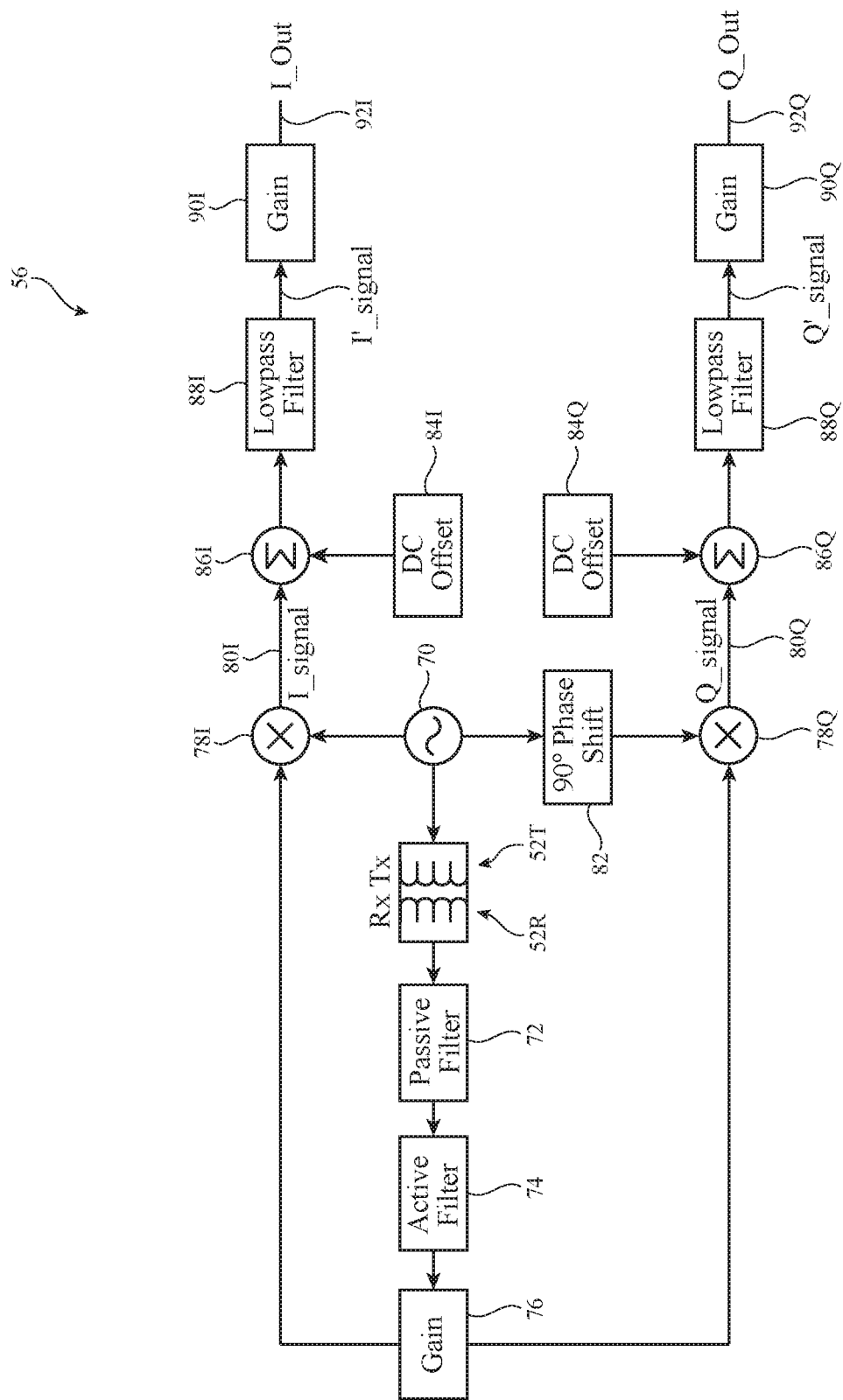
FIG. 6 is a diagram of illustrative detection circuitry for a foreign object detection system in accordance with an embodiment.

Illustrative detection circuitry 56 is shown in FIG. 6. Detection circuitry such as circuitry 56 of FIG. 6 may be used with the coils of array 28 to detect foreign objects in the vicinity of array 28 and detection circuitry such as circuitry 56 of FIG. 6 may be used with the coils of array 24 to detect foreign objects in the vicinity of array 24.

In the example of FIG. 6, detection circuitry 56 has a signal generator such as oscillator (signal transmitter) 70. Oscillator 70 may produce an alternating-current (AC) signal (current) that is driven through a transmitting coil 52T in foreign object coil array 50 (e.g., array 28 or array 24). Switching circuitry 54 (FIG. 2) may be used to route signals from oscillator 70 to a selected transmitting coil 52T. Coil 52T may have a cross-shape, a rectangular shape, or other suitable shape.

The frequency of oscillator 70 may be 350-360 kHz, at least 100 kHz, at least 200 kHz, at least 300 kHz, less than 1 MHz, less than 500 kHz, 355 kHz, or other suitable frequency. Frequency hopping and/or frequency shifting techniques may be used to help reduce interference between the foreign object detection circuitry 56 and other circuitry in system 8 (e.g., power transmitting coil(s) 30 and power receiving coil(s) 20, which may operate at a frequency of 85 kHz, at least 20 kHz, less than 100 kHz, less than 125 kHz, less than 150 kHz, or other suitable frequency. The frequency of oscillator 70 may be selected to avoid overlap with fundamental and harmonic frequencies of the power transmitting and receiving circuitry of system 8 to minimize interference. Detection circuitry 56 may also exhibit a relatively high impedance (e.g., at least 10 k-ohm) at the wireless charging frequency so that eddy currents are not induced in array 24.

The AC signal driven into coil 52T by oscillator 70 produces a corresponding electromagnetic signal (magnetic field) that is received by a selected receiving coil in the foreign object coil array (e.g., coil 52R, which is near-field coupled to coil 52T and which may be coupled to filter 72 by switching circuitry 54 of FIG. 2). In the presence of a foreign object, eddy currents are induced in the foreign object that produce detectible perturbations in the signals received by coil 52R.

When power is not actively being transmitted between equipment 12 and equipment 10, foreign object detection signals from oscillator 70 may be maintained at a relatively low power. During active wireless power transfer operations, the power of the foreign object detection signals produced by oscillator 70 may be increased to help maintain a desired signal-to-noise ratio for foreign object detection operations. When power is not being wirelessly transferred, oscillator 70 may produce a first output power (e.g., foreign object detection circuitry 56 may operate in a low-signal or low-power foreign object detection mode). When power is being wirelessly transferred, oscillator 70 may produce a second output power that is greater than the first output power (e.g., foreign object detection circuitry 56 may operate in a high-signal or high power foreign object detection mode).

As shown in FIG. 6, the detected signals from coil 52R may be filtered using filter 72 (e.g., to remove signals such as signals associated with wireless power transfer that do not correspond to foreign object detection signals). Filter 72 may be a passive filter to help ensure that filter 72 can withstand high voltages (e.g., 50 V peak-to-peak) that may be induced on coil 52R during wireless power transfer operations. Filter 72 may be a notch filter, bandpass filter, or other suitable frequency-dependent filter that helps remove signals at the wireless power transfer frequency of system 8 (e.g., signals at 85 kHz as an example) or other noise signals and allows foreign object detection signals from coil 52R to pass. Filter 74, which may be, for example, an active filter that is characterized by a high Q factor, may be a bandpass filter that is aligned with the frequency of oscillator 70 (e.g., 355 kHz, etc.). Gain block 76 may strengthen the signal at the output of filter 74 and may provide this signal to mixing circuitry such as multipliers 78I and 78Q.

Multiplier 78I may multiply the received signal from coil 52R by the output of oscillator 70 to produce an in-phase signal I_signal on path 80I. Multiplier 78Q may multiply the received signal from coil 52R by the output of oscillator 70 that has been shifted in phase by 90° using phase shifter 82 to produce a quadrature signal Q_signal on path 80Q. Direct-current (DC) offset circuits 84I and 84Q and summers 86I and 86Q may be used to remove a DC offset from the signals on respective paths 80I and 80Q. The offset that is removed may be computed based on data gathered during precharacterization measurements, information on temperature drift, etc.

The presence of foreign objects may lead to differences in the signals on paths 80I and 80Q between different coils in the array. Overall changes in these signals may be a result of temperature drift or other signal drift. After removing offsets, low-pass filters 88I and 88Q may remove undesired AC signals on paths 86I and 86Q (e.g., beat terms from the multiplication performed by multipliers 78I and 78Q) and gain blocks 90I and 90Q can strengthen these low-pass-filtered signals to produce corresponding in-phase and quadrature signals on outputs 92I and 92Q (signal I_out and signal Q_out, respectively).

The in-phase and quadrature output signals from foreign object detection circuitry 56 may be processed by control circuitry 34 and/or 14 and suitable action taken by control circuitry 34 and/or 14 based on these signals. For example, circuitry 34 and/or 14 may use components 36 and/or 16 to issue visual and/or audible alerts for a user or may produce other information that informs users of system 8 that foreign objects may be present and/or may take action such as shutting down wireless power transfer operations until the foreign object has been cleared from system 8.

The operation of circuitry 56 of FIG. 6 may be understood with reference to equations 1-6 of FIG. 7. Equations 1-3 show how in-phase signal I_signal on path 80I and in-phase signal I'_signal at the output of low-pass filter 88I may be produced using circuitry 56. Equations 4-6 show how quadrature signal Q_signal on path 80Q and quadrature signal Q'_signal at the output of low-pass filter 88Q may be produced using circuitry 56.

Term 94 in equation (1) represents the raw signal output from coil 52R (coefficient $A_f$ corresponds to deviations due to a foreign object present between coils 28' and 24') and term 96 (with coefficient $A_m$) is the output from oscillator 70 that is mixed with this raw signal output using multiplier 78I. Term 98 of equation (2) corresponds to a DC signal produced by a foreign object on the foreign object detection coil array (e.g., array 28 or 24 of FIG. 1). HF_noise represents a noise component (e.g., noise produced as a result of wireless power transmission operations, etc.).

Terms 96 of equation 2, which results from simplifying equation 1, may be removed using low-pass filter 88I, thereby allowing term 98 of equation 2 to be extracted. The signal I' signal at the output of low-pass filter 88I is shown in equation 3. Term 100 of equation 3 corresponds to the contribution to I_signal from the foreign object. Term 102 of equation 3 corresponds to normal transmitter-receiver coupling through coils 52T and 52R. Terms 102 and 104 can be removed by adjustment of signal DC offset from circuit 84I.

Gain stage 90I and analog-to-digital converter circuitry (e.g., an analog-to-digital converter with at least 10 bits of resolution or other suitable analog-to-digital converter circuitry) and processing circuitry (e.g., microprocessor circuitry) in control circuitry 14 and/or 34 can use the resulting in-phase signal I_out at output line 92I and the corresponding quadrature signal Q_out that is produced at output line 92Q in accordance with equations 4, 5, and 6. In particular, the control circuitry can use the I_out and Q_out signals to detect and analyze foreign objects. If desired, the I_out and Q_out signals may be analyzed by the control circuitry within a relatively short amount of time (e.g., less than 100 ms or other suitable time) to produce phase shift and magnitude information that provides insight into the metallurgy, shape, and size of the foreign object in real time, so that appropriate action can be taken (e.g., actions such as shutting off wireless power transmission to avoid undesirable eddy current heating in conductive foreign objects, alerting a user, etc.).

Detection circuitry 56 of FIG. 6 may be systematically coupled to each of a number of different transmitting coils 52T and each of a number of corresponding different receiving coils 52R using switching circuitry such as switching circuitry 54 of FIG. 2. In this way, system 8 may step sequentially through each transmitting coil and each receiving coil in coil array 50 during foreign object detection operations, thereby avoiding the need to replicate circuitry 56 repeatedly to accommodate measurements with various different sets of coils.

Figure 8:
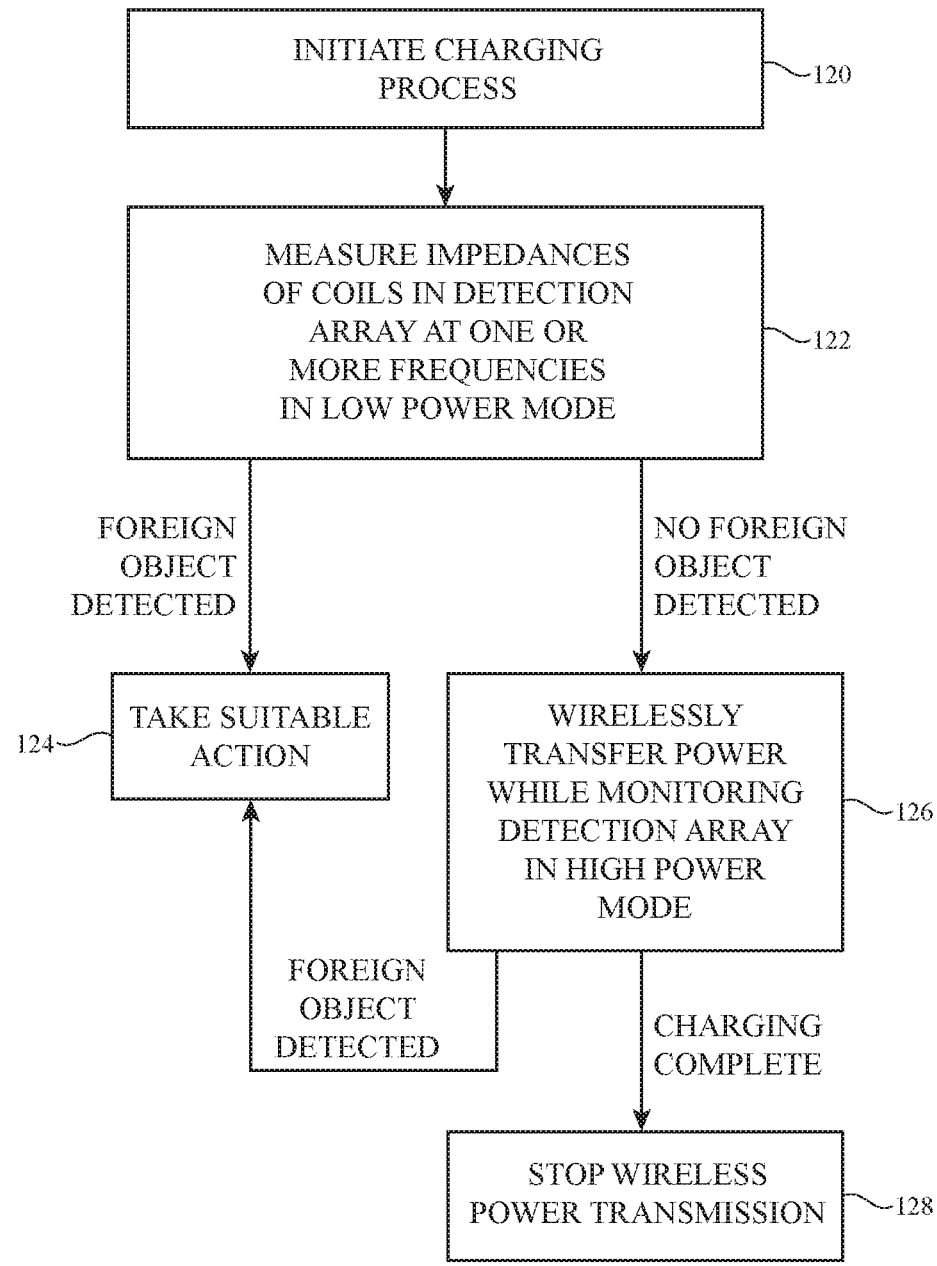
FIG. 8 is a flow chart of illustrative operations associated with monitoring for foreign objects in a wireless power transfer system in accordance with an embodiment.

Illustrative operations involved in using detection circuitry 56 of FIG. 6 to monitor for foreign objects during use of system 8 are shown in FIG. 8.

During the operations of block 120, wireless power transfer operations may be initiated. For example, a user command, a sensor output (e.g., the output of a proximity sensor), a signal from a wireless communications circuit, or other signal may indicate to control circuitry 14 and/or 34 that power receiving equipment 10 is in the vicinity of power transmitting equipment 12 and is ready to receive wireless power.

During the operations of block 122, before power is wirelessly transmitted, control circuitry 34 and 14 may use arrays 28 and 24 to monitor for foreign objects in a low-power foreign object detection mode. In particular, detection circuitry such as circuitry 56 of FIG. 6 may be used with array 28 and with array 24 to monitor for the presence of foreign objects, as described in connection with FIGS. 6 and 7 while oscillator 70 and the other circuits of FIG. 6 are operated at low powers. Frequency hopping and/or shifting may be used to help reduced interference. In-phase and quadrature signals may be gathered and processed in real time to determine whether a foreign object is present and, if present, to characterize the foreign object. As an example, a magnitude M that is equal to the square root of the in-phase signal squared plus the quadrature signal squared may be computed and this magnitude may be plotted as a function of phase shift. If the value of magnitude M is zero, it can be concluded that no foreign object is present. Magnetic objects (e.g., ferromagnetic objects) such as steel washers may be characterized by negative phase shifts. Conductive nonmagnetic objects may be characterized by positive phase shifts. During the operations of block 122, information on phase shift, magnitude M, and other information associated with the in-phase and quadrature signals may be analyzed and used in monitoring for the presence of foreign objects and used in characterizing any foreign objects that are present.

In response to detection of a foreign object, appropriate action may be taken during the operations of block 124. For example, system 8 may shut down wireless power transfer operations until the foreign object is cleared, may issue an alert to a user, or may take other suitable actions.

In response to determining that no foreign objects are present during the operations of block 122, system 8 may wirelessly transfer power from equipment 12 to equipment 10. During power transmission operations, transmitter 32 may wirelessly transmit power using one or more power transmitting coils 30 while power receiving circuitry such as rectifier 18 may use one or more power receiving coils 20 to receive the wirelessly transmitted power. As power is being transmitted in this way, foreign object detection circuitry 56 associated with coil array 28 and foreign object detection circuitry 56 associated with coil array 24 may be operated in a high power foreign object detection mode to monitor for the presence of foreign objects.

If a foreign object is detected during the operations of block 126, suitable action may be taken at block 124 (e.g., wireless power transmission may be stopped, etc.). If no foreign objects are detected, wireless power transfer operations may continue until wirelessly transmitted power is no longer desired. For example, in a system such as system 8 of FIG. 1, wireless power transfer operations may continue until equipment 10 has recharged battery 22 and no longer is using the wirelessly transmitted power. In this type of scenario, wireless power transmission operations may be halted during the operations of block 128.

Figure 9:
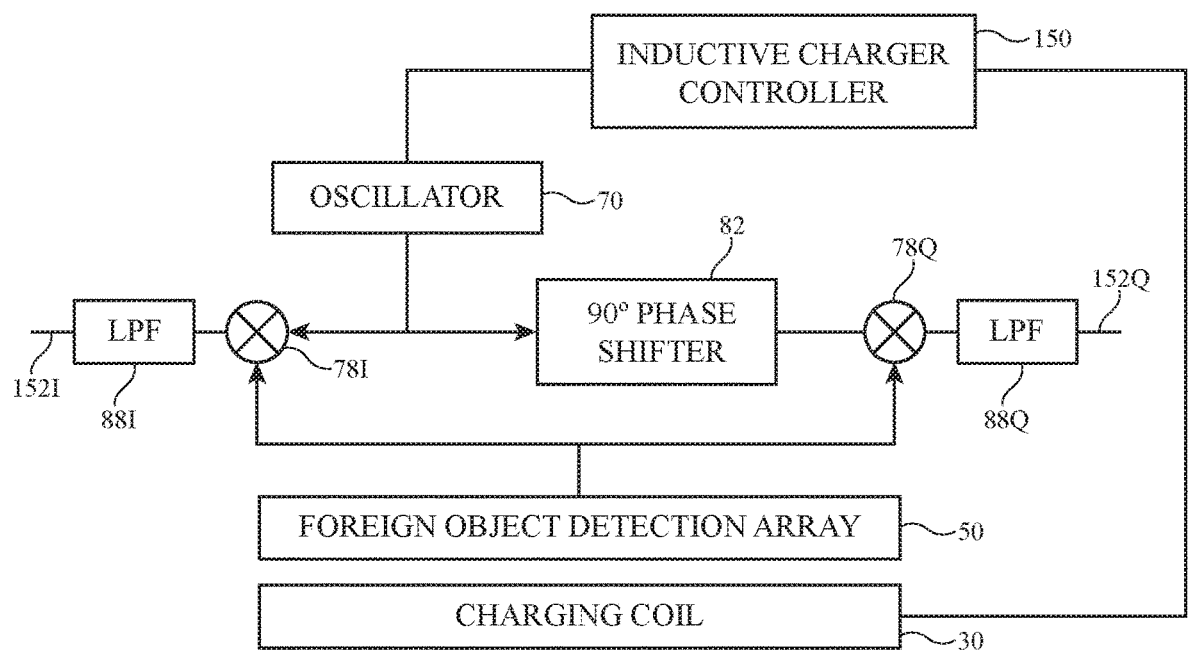
FIG. 9 is a circuit diagram of illustrative foreign object detection circuitry in a system in which magnetic fields from a charging coil are monitored to detect the presence of foreign objects in accordance with an embodiment.

If desired, wireless signals for foreign object detection may be transmitted using one or more power transmitting coil(s) 30 while circuitry 56 monitors corresponding received signals in coil array 50 (e.g., array 28 and/or array 24). Illustrative circuitry for this type of arrangement is shown in FIG. 9. As shown in FIG. 9, control circuitry 14 and/or 34 (e.g., inductive charger controller 150) may receive oscillator output signals from oscillator 70 and may use these signals in creating corresponding wireless power transmission signals with charging coil(s) 30 (e.g., transmitter circuitry in controller 150 such as transmitter 32 of FIG. 1 may supply signals from oscillator 70 or may supply signals that are synchronized to the output of oscillator 70 to coil 30 so that coil 30 can use these signals to transmit corresponding wireless electromagnetic signals that are detected by array 50). The output of oscillator 70 may also be provided to multiplier 78I and (via phase shifter 82) to multiplier 78Q. Low-pass filters 88I and 88Q may then produce in-phase and quadrature signals on respective outputs 152I and 152Q for real-time analysis by control circuitry 14 and/or 34 as described in connection with FIG. 6.

Figure 10:
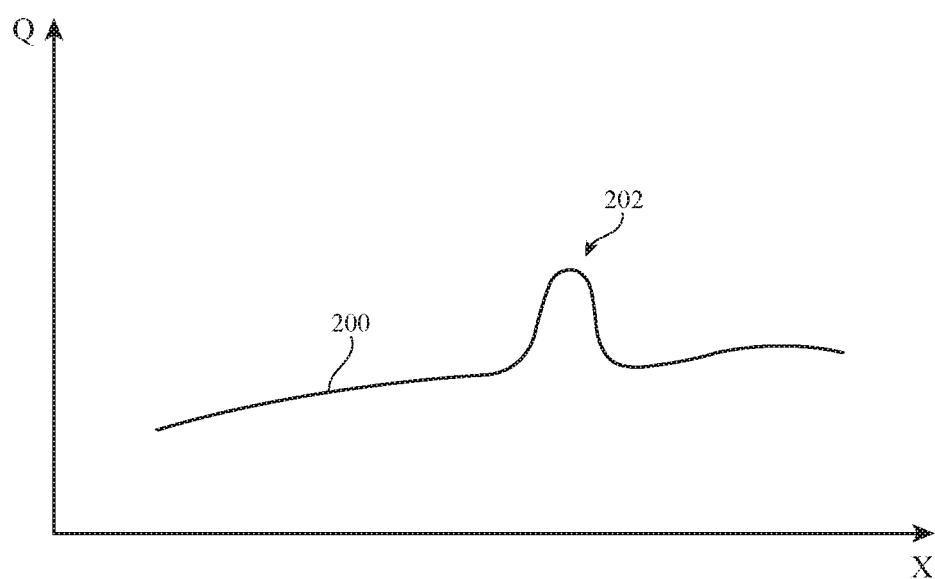
FIG. 10 is a graph showing how a signal peak may be identified in a signal received from foreign object detection circuitry (e.g., an in-phase or quadrature signal) when a foreign object is present on a foreign object detection coil array in accordance with an embodiment.

Regardless of whether oscillator 70 of the circuitry of FIG. 9 uses coil 30 to transmit electromagnetic signals for detection by the foreign object detection coil array or whether oscillator 70 of the circuitry of FIG. 6 uses transmitting coil 52T in the foreign object detection coil array to transmit electromagnetic signals for detection by the foreign object detection coil array, control circuitry 14 and/or 34 may be configured to process the resulting in-phase and quadrature signals that are detected by circuitry 56 to identify signal characteristics that are indicative of the presence of foreign objects. The control circuitry of system 8 may, as an example, make measurements from a series of coils 52 at different lateral positions and can analyze these measurements to identify signal peak(s) indicative of the presence of foreign objects. As an example, the control circuitry may use the in-phase and/or quadrature signals to produce a graph of the type shown in FIG. 10 in which signal strength (e.g., quadrature signal Q or other suitable measured signal) is plotted as a function of lateral position X across the foreign object detection coil array. Analyzing curve 200 of FIG. 10, the control circuitry can identify signal peaks such as signal peak 202 that is indicative of the presence of a foreign object at a corresponding X location within the foreign object detection coil array.

The foregoing is merely illustrative and various modifications can be made to the described embodiments. The foregoing embodiments may be implemented individually or in any combination.

What is claimed is:

1. A wireless power transfer system comprising:
  a wireless power transfer coil;
  a foreign object detection coil array overlapping the wireless power transfer coil;
  foreign object detection circuitry that is coupled to the foreign object detection coil array and that is configured to produce in-phase and quadrature signals indicative of whether a foreign object is overlapping the foreign object detection coil array, wherein the foreign object detection circuitry comprises:
    an oscillator configured to supply an oscillator output to a transmitting coil in the foreign object detection coil array, wherein the foreign object detection coil array comprises a receiving coil that at least partially overlaps the transmitting coil; and
  control circuitry configured to receive the in-phase and quadrature signals from the foreign object detection circuitry.

2. The wireless power transfer system defined in claim 1 wherein the oscillator is configured to supply the oscillator output at a frequency less than 1 MHz to the transmitting coil in the foreign object detection coil array, wherein the receiving coil in the foreign object detection coil array is configured to receive signals corresponding to the oscillator output supplied to the transmitting coil and wherein the wireless power transfer system further comprises:
  filter circuitry configured to filter the signals received by the receiving coil to produce filtered signals.

3. The wireless power transfer system defined in claim 2 wherein the foreign object detection circuitry comprises:
  a phase shifter configured to receive the oscillator output and provide a corresponding phase-shifted oscillator output;
  a first multiplier configured to multiply the oscillator output and the filtered signals to produce the in-phase signal; and
  a second multiplier configured to multiply the phase-shifted oscillator output and the filtered signals to produce the quadrature signal.

4. The wireless power transfer system defined in claim 3 further comprising:
  circuitry configured to remove direct-current offsets from the in-phase and quadrature signals.

5. The wireless power transfer system defined in claim 3 further comprising:
  low pass filter circuitry configured to filter the in-phase and quadrature signals.

6. The wireless power transfer system defined in claim 2 wherein the filter circuitry comprises a passive filter and an active filter.

7. The wireless power transfer system defined in claim 1 further comprising:
  a ferromagnetic layer, wherein the wireless power transfer coil overlaps the ferromagnetic layer.

8. The wireless power transfer system defined in claim 7 wherein the wireless power transfer coil is a wireless power transmitting coil, the wireless power transfer system further comprising a wireless power transmitter coupled to the wireless power transmitting coil that is configured to transmit power wirelessly to wireless power receiving equipment.

9. The wireless power transfer system defined in claim 8 further comprising a mains power source configured to supply power to the wireless power transmitter.

10. The wireless power transfer system defined in claim 7 wherein the wireless power transfer coil is a wireless power receiving coil, the wireless power transfer system further comprising a rectifier coupled to the wireless power receiving coil to receive power wirelessly from wireless power transmitting equipment.

11. The wireless power transfer system defined in claim 10 further comprising a battery that is configured to receive power from the rectifier.

12. The wireless power transfer system defined in claim 1 wherein the foreign object detection coil array comprises cross-shaped coils.

13. The wireless power transfer system defined in claim 12 wherein each cross-shaped coil has a metal trace on a printed circuit board.

14. The wireless power transfer system defined in claim 1 wherein the control circuitry is configured to process signals from the foreign object detection circuitry to identify a signal peak associated with a location on the foreign object detection coil array at which foreign object is located.

15. The wireless power transfer system defined in claim 1 wherein the oscillator is configured to supply the oscillator output at a frequency less than 1 MHz to the transmitting coil in the foreign object detection coil array.

16. Wireless power transmitting equipment, comprising:
a wireless power transmitting coil;
a wireless power transmitter coupled to the wireless power transmitting coil and configured to wirelessly transmit power to wireless power receiving equipment through the wireless power transmitting coil;
a foreign object detection coil array overlapping the wireless power transmitting coil; and
foreign object detection circuitry coupled to the foreign object detection coil array, wherein the foreign object detection circuitry is configured to produce in-phase and quadrature output signals based on a signal received from a coil in the foreign object detection coil array and wherein the foreign object detection circuitry comprises:
an oscillator configured to supply an oscillator output corresponding to the signal to an additional coil in the foreign object detection coil array, wherein the coil and the additional coil in the foreign object detection coil array are at least partially overlapping.

17. The wireless power transmitting equipment defined in claim 16 wherein the foreign object detection coil array is formed from metal traces on a printed circuit, the wireless power transmitting equipment further comprising control circuitry configured to stop wireless power transmission with the wireless power transmitter in response to determining that a foreign object is present on the foreign object detection coil array based on the in-phase and quadrature output signals.

18. The wireless power transmitting equipment defined in claim 17 wherein the oscillator is configured to produce the oscillator output at a frequency between 100 kHz and 1 MHz, wherein the oscillator is configured to provide the oscillator output to the additional coil in the foreign object detection coil array, wherein the wireless power transmitter is configured to transmit the wireless power at an additional frequency of less than 100 kHz, and wherein the oscillator is configured to produce the oscillator output at a first power when the wireless power transmitter is inactive and a second power that is greater than the first power when the wireless power transmitter is wirelessly transmitting power to the wireless power receiving equipment.

19. Wireless power receiving equipment, comprising:
a wireless power receiving coil;
a rectifier coupled to the wireless power receiving coil and configured to wirelessly receive power from wireless power transmitting equipment through the wireless power transmitting coil;
a foreign object detection coil array overlapping the wireless power receiving coil; and
foreign object detection circuitry coupled to the foreign object detection coil array, wherein the foreign object detection circuitry is configured to produce in-phase and quadrature output signals based on a signal received from a coil in the foreign object detection coil array and wherein the foreign object detection circuitry comprises:
an oscillator configured to supply an alternating current drive signal corresponding to the signal to an additional coil in the foreign object detection coil array, wherein the coil and the additional coil in the foreign object detection coil array are at least partially overlapping.

20. The wireless power receiving equipment defined in claim 19 further comprising control circuitry configured to determine when a foreign object is present based on the in-phase and quadrature output signals, wherein the alternating current drive signal is supplied at a frequency that is at least 100 kHz and less than 1 MHz and wherein the foreign object detection coil array is formed from an array of copper traces on a printed circuit.

\* \* \* \* \*